US012313486B2

(12) United States Patent
Neumann et al.

(10) Patent No.: US 12,313,486 B2
(45) Date of Patent: May 27, 2025

(54) SCREW LOAD TESTING DEVICE AND METHOD FOR PERFORMING A LOAD TEST ON A SCREW

(71) Applicant: KISTLER HOLDING AG, Winterthur (CH)

(72) Inventors: Gerald Neumann, Hückeswagen (DE); Christoph Bodensteiner, Wermelskirchen (DE)

(73) Assignee: Kistler Holding AG, Winterthur (CH)

( * ) Notice: Subject to any disclaimer, the term of this patent is extended or adjusted under 35 U.S.C. 154(b) by 640 days.

(21) Appl. No.: 17/610,477

(22) PCT Filed: May 4, 2020

(86) PCT No.: PCT/EP2020/062235
§ 371 (c)(1),
(2) Date: Nov. 11, 2021

(87) PCT Pub. No.: WO2020/229204
PCT Pub. Date: Nov. 19, 2020

(65) Prior Publication Data
US 2022/0221358 A1    Jul. 14, 2022

(30) Foreign Application Priority Data

May 13, 2019   (EP) ..................................... 19174157

(51) Int. Cl.
*G01L 5/24*   (2006.01)
*G01L 5/00*   (2006.01)

(52) U.S. Cl.
CPC ..................................... *G01L 5/24* (2013.01)

(58) Field of Classification Search
CPC ........................................................ G01L 5/243
See application file for complete search history.

(56) References Cited

U.S. PATENT DOCUMENTS 3,382,709 A * 5/1968 Sorensen .................. G01L 5/24
73/761
3,493,906 A * 2/1970 Zitterberg ............... G01L 5/221
244/234

(Continued)

FOREIGN PATENT DOCUMENTS

CN           108 915 748 A      11/2018
DE     102016205961 A1 *  10/2017   ............. F16D 65/56

(Continued)

OTHER PUBLICATIONS

EPO Search Report and Written Opinion, Nov. 12, 2019, 7 pages.
PCT Search Report and Written Opinion, Aug. 4, 2020, 21 pages.

*Primary Examiner* — Jill E Culler
*Assistant Examiner* — Ruben C Parco, Jr.
(74) *Attorney, Agent, or Firm* — Dority & Manning, P.A.

(57) ABSTRACT

The invention relates to a screw load testing device that includes a housing configured to support a screw and a mating element that is formed as a threaded nut and is positioned to interact with a threaded portion of the screw. The screw load testing device housing includes a measuring device for detecting an axial force acting on the screw and/or for detecting a torque acting on the screw. A first housing member is configured to interact at least indirectly with a portion that is in monolithic connection to the screw. A second housing member is configured to interact with the threaded nut, and the two housing members are arranged movably relative to each other at least in the direction of a longitudinal axis.

10 Claims, 5 Drawing Sheets

(56) References Cited

U.S. PATENT DOCUMENTS

| | | | | |
|---|---|---|---|---|
| 5,156,054 A | * | 10/1992 | Mikulencak | G01L 5/06 |
| | | | | 73/862.471 |
| 2010/0162829 A1 | | 7/2010 | Chiapuzzi | |
| 2011/0184666 A1 | * | 7/2011 | Imai | G01L 5/24 |
| | | | | 702/43 |
| 2012/0118079 A1 | * | 5/2012 | Foster | G01L 5/24 |
| | | | | 73/862.21 |
| 2019/0301961 A1 | * | 10/2019 | Tolley | G01L 25/00 |

FOREIGN PATENT DOCUMENTS

| | | |
|---|---|---|
| EP | 1 764 596 A2 | 3/2007 |
| JP | 2015090359 A * | 5/2015 |
| WO | WO 2008/151799 A1 | 12/2008 |

* cited by examiner

SCREW LOAD TESTING DEVICE AND METHOD FOR PERFORMING A LOAD TEST ON A SCREW

CROSS REFERENCE TO RELATED APPLICATIONS

The present application claims priority to International Application Serial No. PCT/EP2020/062235, which is hereby incorporated herein in its entirety by this reference for all purposes.

FIELD OF THE INVENTION

The present invention relates to a screw load testing device wherein such screw load testing device is particularly suitable for testing strength values of a screw. Furthermore, the invention relates to the use of a screw load testing device according to the invention and to a method for performing a load test on a screw using a screw load testing device according to the invention.

BACKGROUND OF THE INVENTION

Screws are well-known. According to VDI/VDE 2645 Part 2:2014-09, screws enable establishing a detachable threaded connection that joins two or more parts so that they behave like one piece under all existing operating forces. During the production of screws, random samples of screw batches are tested for compliance with specified strength values. This so-called load testing is carried out by using a screw load testing device.

Such a screw load testing device having the features of the preamble of claim 1 is known from WO2008/151799A1, which corresponds to US Patent Application Publication No. 2010-0162829, which is hereby incorporated herein in its entirety by this reference for all purposes. This known screw load testing device used for load testing of conventional screws comprises a housing having a plurality of housing members wherein a screw head axially abuts against an end face of a first housing member and a threaded nut cooperating with a threaded portion of the screw contacts an end face of a second housing member. When a tightening torque is applied to the screw, the two housing members are clamped against one another by the screw. A measuring device may be used to measure the amount of clamping as an axial force and/or a torque.

Such a screw load testing device is useful for testing conventional screws either in a non-destructive test or in a test that uses a load resulting in destruction of the screw. Generally, destruction of the screw during a destructive load test particularly occurs in the threaded portion of the screw so that after destruction of the screw it is relatively easy to separate the two housing members from each other or to remove screw fragments from the screw load testing device.

However, such a screw load testing device known from the prior art is of only limited use in a destructive load test of a breakaway screw. A breakaway screw has two screw heads arranged one after the other along its longitudinal axis. A rear screw head breaks off when a predetermined tightening torque is applied. Breakaway screws are used in many technical fields as a safety element or an anti-theft device. The reason is that once the rear screw head has broken off, specialized tools must be employed for removing the remaining screw body from the screw connection. Breakaway screws vary widely especially with respect to the shape and size of the rear screw head.

Thus, in a destructive load test of a breakaway screw the two housing members of the screw load testing device are clamped against one another by the axial force and the space for applying the specialized tool is structurally blocked by the housing members. Therefore, it is impossible to reach the appropriate tool engagement surfaces with the specialized tool and to remove the screw fragments from the screw load testing device.

In practice, it has been tried to solve this problem by providing the breakaway screw to be tested prior to the load test with additional tool engagement surfaces in those areas of the breakaway screw that are still accessible on the screw body from the outside after the screw head, i.e. the original tool engagement surface, broke off. On the one hand, this has the disadvantage that attaching or forming such additional tool engagement surfaces that merely serve for loosening the breakaway screw after the destructive load test requires additional work. Furthermore, it is considered to be a particular disadvantage that mechanical processing of the breakaway screw for forming the additional tool engagement surfaces is typically associated with thermal stressing of the material of the screw body which may lead to a change in the microstructure of the material and thus to altered strength properties of the screw body. This may falsify the measurement results during the load test of a breakaway screw.

EXEMPLARY OBJECT AND SUMMARY OF THE INVENTION

It is an object of the present invention to provide a screw load testing device allowing for easy removal of the screw from the screw load testing device after the end of a load test or after destruction of the screw.

This object has been achieved by the features described more fully below.

The invention relates to a screw load testing device comprising a housing configured to arrange a screw and a mating element that interacts with a threaded portion of the screw and is in particular formed as a threaded nut, said housing comprising a first housing member configured to interact at least indirectly with a portion that is in monolithic connection to the screw, said housing further comprising a second housing member configured to interact with the mating element, wherein the two housing members are arranged movable with respect to one another at least in the direction of a longitudinal axis, and wherein the screw load testing device further comprises a measuring device for detecting an axial force F acting on the screw and/or for detecting a torque M acting on the screw, wherein a clamping device is provided for moving the two housing members from a first position to at least a second position, and wherein in the first position a first distance in the direction of the longitudinal axis between two contact surfaces configured to cooperate with the screw and the mating element is smaller than a second distance of the two contact surfaces in the second position.

The idea underlying the present invention is that after a (destructive) load test was performed on the screw it is essential for removing the screw fragments to reduce an axial force applied on the two housing members cooperating with the screw for the load test so that the still intact screw body can be released from its mating element (nut) arranged in the housing, ideally by hand and without providing specific tool engagement surfaces.

In view of the above, the teaching of the invention provides for constructing the screw load testing device in such a way that the two housing members cooperating with the screw may be moved by means of a clamping device from a first position into at least a second position, and in such a way that in the first position a first distance in the direction of the longitudinal axis between two contact surfaces configured to cooperate with the screw and the mating element is smaller than a second distance of the two contact surfaces in the second position.

Advantageous further embodiments of the screw load testing device according to the invention are provided in the dependent claims.

In a particularly preferred embodiment of the invention at present, resetting means eliminates the need for the user to manually move the two housing members of the housing after destruction or the end of the load test of the screw from their second position in which they are arranged at a distance from one another into their first position in which they are arranged at a smaller distance from one another. The resetting means are configured to move the two housing members of the housing in the direction of the first position. Thus, when the clamping device is deactivated, then the housing members are automatically reset in the direction of their first axial position.

There are several options with regard to the specific construction of the resetting means. A mechanical structure is preferred where the resetting means are formed as at least one spring element. A particular advantage of this construction is that it will achieve resetting of the housing members in the desired manner without needing additional actuation or auxiliary structures. The spring element is in particular a compression spring. A specific constructional realization provides for the at least one spring element to be arranged in the area of the clamping device between two members of the clamping device configured to be movable relative to one another in the direction of the longitudinal axis. It is further particularly preferred to provide not only one spring element or one compression spring but rather a plurality of spring elements or compression springs. In this case, it is particularly preferred to provide these arranged at uniform angular intervals on a pitch circle diameter around the longitudinal axis of the housing members. Furthermore, it should be noted that instead of mechanical resetting means or spring elements it is also conceivable to form the resetting means as pneumatic or hydraulic resetting means by using compressed air or a hydraulic medium, for example.

With regard to the clamping device for generating a preloading force that acts on the two housing members in the direction of the second position it is particularly preferred to provide a clamping device in the form of a hydraulic clamping device. A hydraulic clamping device comprises a piston and a cylinder. The piston is pressurized by hydraulic medium and drives the piston up through the cylinder during which the piston is guided in the cylinder. A particular advantage of using a hydraulic clamping device is that relatively high clamping forces acting in the axial direction may be absorbed and that, furthermore, the piston will not exhibit any perturbing stroke variations because the hydraulic medium is incompressible.

In a further advantageous embodiment, pressurization by the hydraulic medium is achieved by means of an electric pump or a pneumatic system.

In order to be able, on the one hand, to use one and the same housing or one and the same housing members for (breakaway) screws having different thread diameters and, on the other hand, to ensure that an axial force acting on the (breakaway) screw and/or a torque acting on the (breakaway) screw after a tightening torque was applied only acts in the area of a contact surface of the mating element cooperating with the screw and of the screw head, respectively, and may be detected by a measuring device in a precise manner, another structural embodiment of the housing provides for the housing to be configured for receiving the screw between the two contact surfaces forming a radial gap therebetween.

In a further advantageous embodiment of the screw load testing device, in order to be able to use the screw load testing device for a variety of screw sizes without need for elaborate modifications or long setup times, the screw load testing device is provided with a size change member that preferably has a plurality of through-holes with various diameters and is provided as a mating element for the portion in monolithic connection to the (breakaway) screw, and the mating element may be positioned in a rotationally fixed manner in axial contact to the first housing member of the housing.

Furthermore, a plurality of options also exist with respect to the arrangement and construction of the measuring device. A particularly advantageous embodiment with respect to construction provides for arranging the measuring device between the second housing member and a further member wherein the second housing member and the further member are arranged to be movable relative to one another in the direction of the longitudinal axis and about the longitudinal axis, and wherein the measuring device is preferably arranged in direct contact with the second housing member and the further member.

The manufacture of the individual housing members of the housing is particularly easy and economical when they are formed as turned members. In this respect, a further embodiment of the invention includes at least the first and second housing members in the shape of sleeves or rings.

The invention further comprises the use of a screw load testing device according to the invention as described above for performing load tests on breakaway screws. Such a use is particularly advantageous since due to the construction of the screw load testing device according to the invention it is very easy to remove the fragments of a breakaway screw present on the housing after a destructive load test of the screw.

Furthermore, the present invention also encompasses a method for performing a load test on a screw, in particular a breakaway screw, by means of a device according to the invention as described above. The method according to the invention is characterized at least by the following steps:

Moving the first and second housing members from the first to the second position while increasing the axial distance between two contact surfaces for the screw by activating the clamping device;

Inserting the screw and the mating element that cooperates with the screw;

Applying a tightening torque to the screw;

Deactivation of the clamping device after the end of the load test;

Removing the screw.

In a further embodiment of the method, resetting means are provided for moving the two housing members from the second position towards the first position after deactivation of the clamping device.

In a further advantageous embodiment of the method, an axial gap for removing the screw is created between the first contact surface and a portion of the screw cooperating with the first contact surface. A particular advantage of such a method is that the axial force previously acting on the screw is completely eliminated so that the screw may be released from the mating element simply by manually turning or screwing the screw.

Further advantages, features and details of the invention will be apparent from the following description of preferred exemplary embodiments thereof as well as from the drawings.

DETAILED DESCRIPTION OF EXEMPLARY EMBODIMENTS OF THE INVENTION

Figure 1:
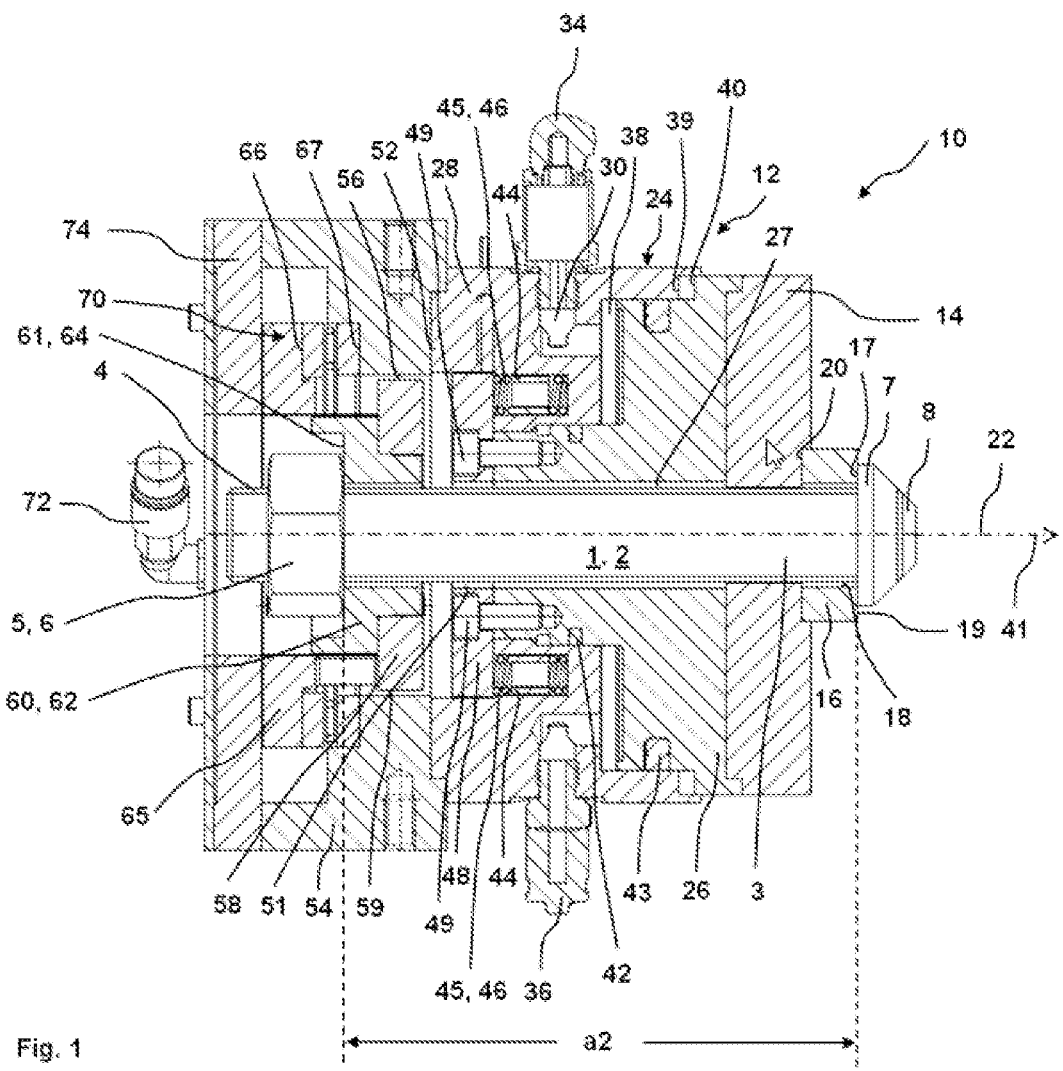
FIG. 1 shows a longitudinal section through a screw testing device according to the invention after a destructive test of a screw before it is removed from the screw testing device.

Throughout the Figures, identical elements or elements having the same function are designated by the same reference numerals.

The screw load testing device 10 as shown in the Figures is for non-destructive or destructive load testing of screws 1. In particular, the screw load testing device 10 is suitable for performing load tests on breakaway screws 2. The breakaway screw 2 is shown in its undestroyed state in FIG. 3 and is characterized by a cylindrical portion 3 having a threaded portion 4 which is only visible in FIG. 1 on at least one end face portion thereof. The threaded portion 4 is configured to cooperate with a mating element 5 formed, for example, as a threaded nut 6. At the other axial end portion of the breakaway screw 2 is defined a (short) cylindrical portion 7 followed by a shear-off portion 8 in the shape of an hourglass that is in monolithic connection to a head portion 9 of the breakaway screw 2. The head portion 9 comprises tool engagement surfaces for applying a tightening torque to the breakaway screw 2 in a manner known per se. In particular, the tool engagement surfaces are formed as planar surfaces so that they are able to cooperate with a wrench or a similar torque applying device, for example.

Figure 3:
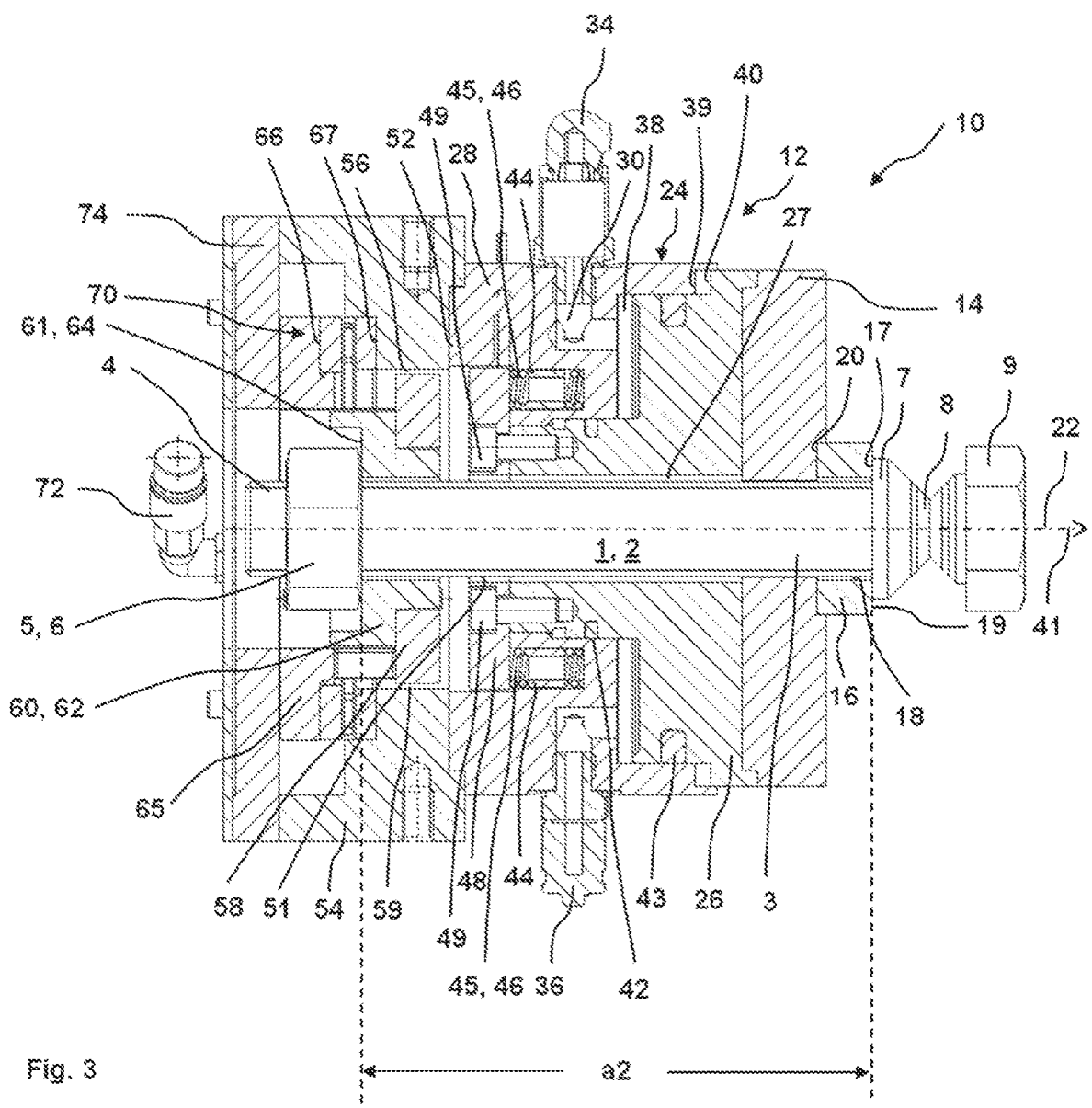

In practice, such a breakaway screw 2 shown in FIG. 3 for example is used for connecting members which must be ensured to be no longer detachable or separable from each other in an easy manner after the members are mounted or connected to one another. For this purpose, a high tightening torque is applied to the breakaway screw 2 via the head portion 9 thereof during mounting of the breakaway screw 2 which leads to its destruction in the region of the shear-off portion 8 or to shearing off of the head portion 9 in the region of the smallest cross-section of the shear-off portion 8. There are no tool engagement surfaces on the remaining cylindrical portion 7 or the shear-off portion 8 so that it is usually impossible to remove such a breakaway screw 2 after mounting without using further auxiliary means or a lot of effort.

The screw load testing device 10 is used to test random samples of batches of screws for compliance with strength values during the manufacture of screws.

The screw load testing device 10 comprises a housing 12 formed from a plurality of members. Housing 12 comprises a first plate-shaped or annular housing member 14 that defines on one opposite surface thereof, a longitudinal groove 20. As shown in FIG. 1 for example, the longitudinal groove 20 is configured to receive therein, a size change member 16. The size change member 16 is axially interposed between the annular housing member 14 and the cylindrical portion 7 of the screw 2 and defines a first contact surface 19 that is configured and disposed to axially abut against the end face 17 of the cylindrical portion 7 of the breakaway screw 2 on the side of the breakaway screw 2 that faces away from the shear-off portion 8.

In the embodiment shown, the size change member 16 has the shape of a rib and comprises through-holes 18 with different diameters so that the size change member 16 may be used for different sizes or diameters of the breakaway screw 2. For this purpose, the cylindrical portion 3 of the breakaway screw 2 passes through a through-hole 18 with a small radial clearance. Furthermore, the first housing member 14 comprises a longitudinal groove 20 that is adapted to the width of the size change member 16, wherein the size change member 16 axially abuts against the bottom of the groove 20, thus forming a rotationally fixed connection between the first housing member 14 and the size change member 16 about a longitudinal axis 22 of the housing 12.

Axially, i.e. in a plane perpendicular to the longitudinal axis 22, the first housing member 14 rests against a clamping device 24. The clamping device 24 is preferably a hydraulic clamping device. The clamping device 24 comprises a first member 26 having a through-bore 27 extending concentrically with the longitudinal axis 22. The diameter of the through-bore 27 is adapted to the diameter of the cylindrical portion 3 of the breakaway screw 2 so that at least a small radial gap is always formed between the cylindrical portion 3 and the through-bore 27. The first member 26 of the clamping device 24 is radially enclosed by a second member 28 of the clamping device 24. The second member 28 has the shape of a sleeve and comprises a hydraulic connection portion 30 and a vent connection element 36. A hydraulic element 34 is disposed in the hydraulic connection portion 30, the hydraulic element 34 being connected to a source of hydraulic fluid, not shown, and to a valve device. The vent connection element 36 serves to vent the clamping device 24. An annular pressure chamber 38 is arranged between the two members 26, 28 of the clamping device 24.

The two members 26, 28 of the clamping device 24 may be moved in the direction of the longitudinal axis 22 from a first position in which the two members 26, 28 rest against each other with axially opposite abutment surfaces 39, 40 (FIG. 5) in the direction of the arrow 41 (FIG. 1) to a second position that is axially spaced-apart in the direction along the longitudinal axis 22 from the first position.

Annular sealing elements 42, 43 such as elastic O-rings are provided between the two members 26, 28 under radial pressure from the clamping device 24 for sealing the pressure chamber 38 from the environment. Preferably, the first member 26 comprises corresponding annular grooves for receiving the annular sealing elements 42, 43. This presently preferred embodiment is particularly space-saving. Alternatively, the second member 28 may comprise the corresponding annular grooves for receiving the annular sealing elements.

A plurality of blind holes 44 are formed, preferably at uniform angular intervals from each other, in the second member 28 of the clamping device 24 on a pitch circle diameter around the longitudinal axis 22 on an end face facing away from the first housing member 14. A spring element 45 in the form of a compression spring is arranged in each of the blind holes 44. The spring elements 45 serve as resetting means 46 for applying a resetting force to the two members 26, 28 of the clamping device 24 in the first position described above. For this purpose, the spring elements 45 are axially supported on an annular support plate 48 that is axially clamped to the first member 26 by means of screws 49. The support plate 48 also comprises a through-bore 51 that receives the cylindrical portion 3 of the breakaway screw 2 forming a radial gap therebetween.

Figure 2:
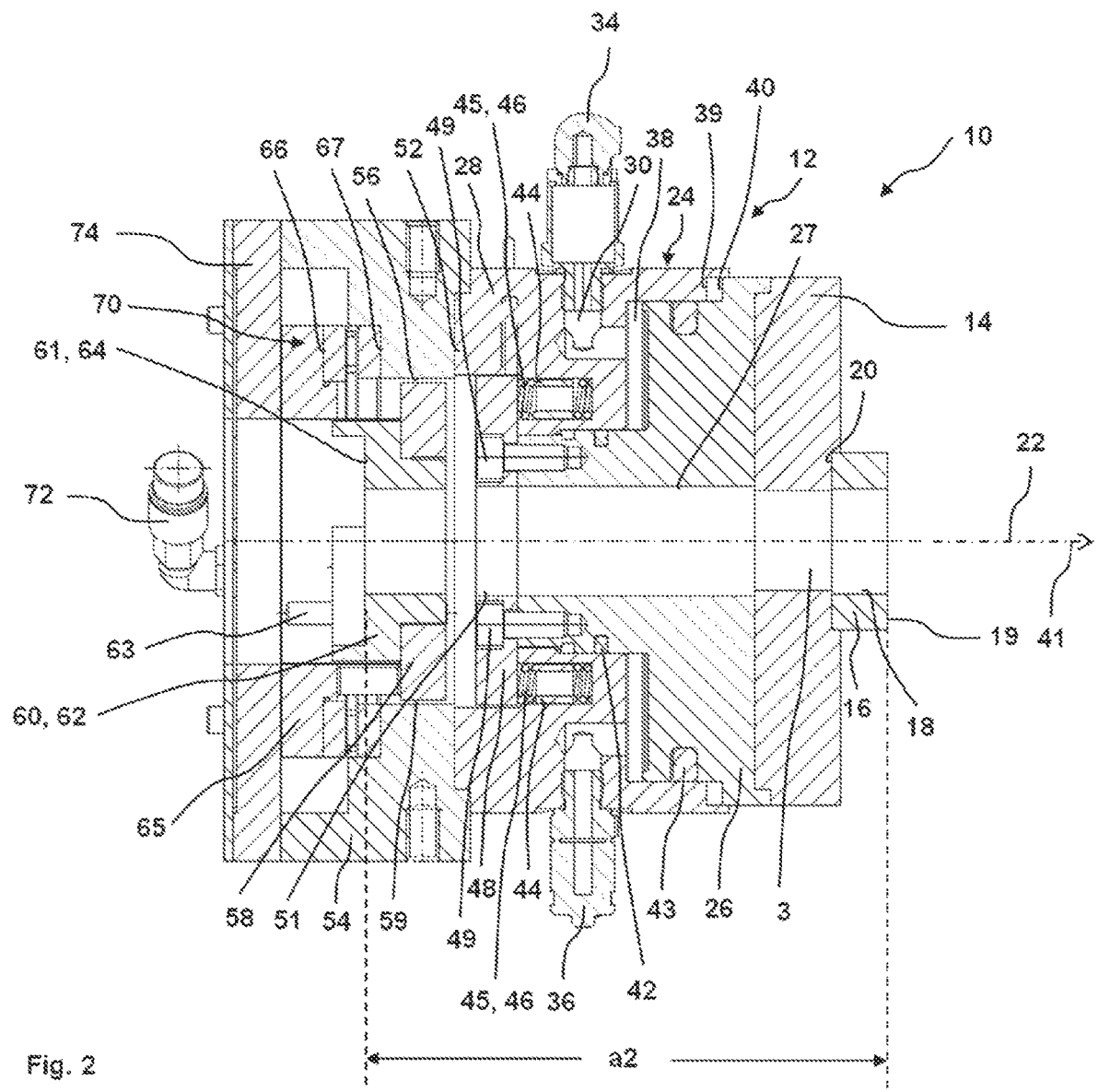
FIG. 2 through 5 show each in a perspective longitudinal section the screw testing device according to FIG. 1 during different phases of screw testing.

With its second member 28, the clamping device 24 axially protrudes on the side facing away from the first housing member 14 into a recess 52 of a further housing member 54 which is part of a measuring device 70. The further housing member 54 comprises a bore portion 56 extending coaxially with the longitudinal axis 22 in which an annular washer 58 is arranged forming a radial gap 59. The annular washer 58 radially receives a portion of a sleeve-shaped insert 60 acting as a second housing member 62. The annular washer 58 and the second housing member 62 are connected to one another in a rotationally fixed manner, for example, by means of a plurality of dowel pins 63 (FIG. 2). The insert 60 or the second housing member 62 forms the surface for axial contact of the threaded nut 6 against an end face 64 of the second housing member 62 acting as the second contact surface 61. Furthermore, the annular washer 58 is connected in a non-rotatable manner to a further washer 65, for example by forming the annular washer 58 and the further washer 65 monolithically.

The measuring device 70 mentioned above is accommodated between two surfaces 66, 67 arranged at a distance apart from one another in the direction of the longitudinal axis 22 and extending annularly around the longitudinal axis 22 on the further washer 65 and the further housing member 54. By way of example only, the measuring device 70, which is for example configured in a manner known per se, further comprises a plurality of strain gauges (not shown) or similar measuring elements which serve to detect an axial force F and/or a torque M acting on the breakaway screw 2 or the threaded nut 6 in the direction of the longitudinal axis 22. By an electrical plug connection 72, the measuring device 70 is connected, for example, to an evaluation unit and/or to a display unit, not shown, configured to evaluate, display and/or store the axial force and/or the torque detected by the measuring device 70.

The washer 65 is clamped in the axial direction via the measuring device 70 against the further housing member 54 by means of a torque measuring body 74.

In the following, the functioning of the screw load testing device 10 described above in a load test of a breakaway screw 2 will be explained with reference to the sequence of Figures shown in FIGS. 2 to 5 as follows: FIG. 2 shows the situation with the breakaway screw 2 not yet mounted on the screw load testing device 10. The pressure chamber 38 is filled via the hydraulic connection portion 30 with pressure medium being under a pre-pressure of, for example, 30 bars, and a return flow of the pressure medium from the pressure chamber 38 is prevented by a respective position of a valve in the hydraulic fluid supply. The hydraulic pressure prevailing in the pressure chamber 38 causes the clamping device 24 and the two members 26, 28 to be moved against the spring forces of the spring elements 45 from their first position to their second position. The second axial position is characterized by a distance a2 between the two contact surfaces 19 and 61 for the breakaway screw 2 in the direction of the longitudinal axis 22. The axial movement is thereby limited by a contact between the support plate 48 and the extended second member 28 of the clamping device 24 wherein optionally the second axial position is monitored by a proximity sensor (not shown).

Figure 4:
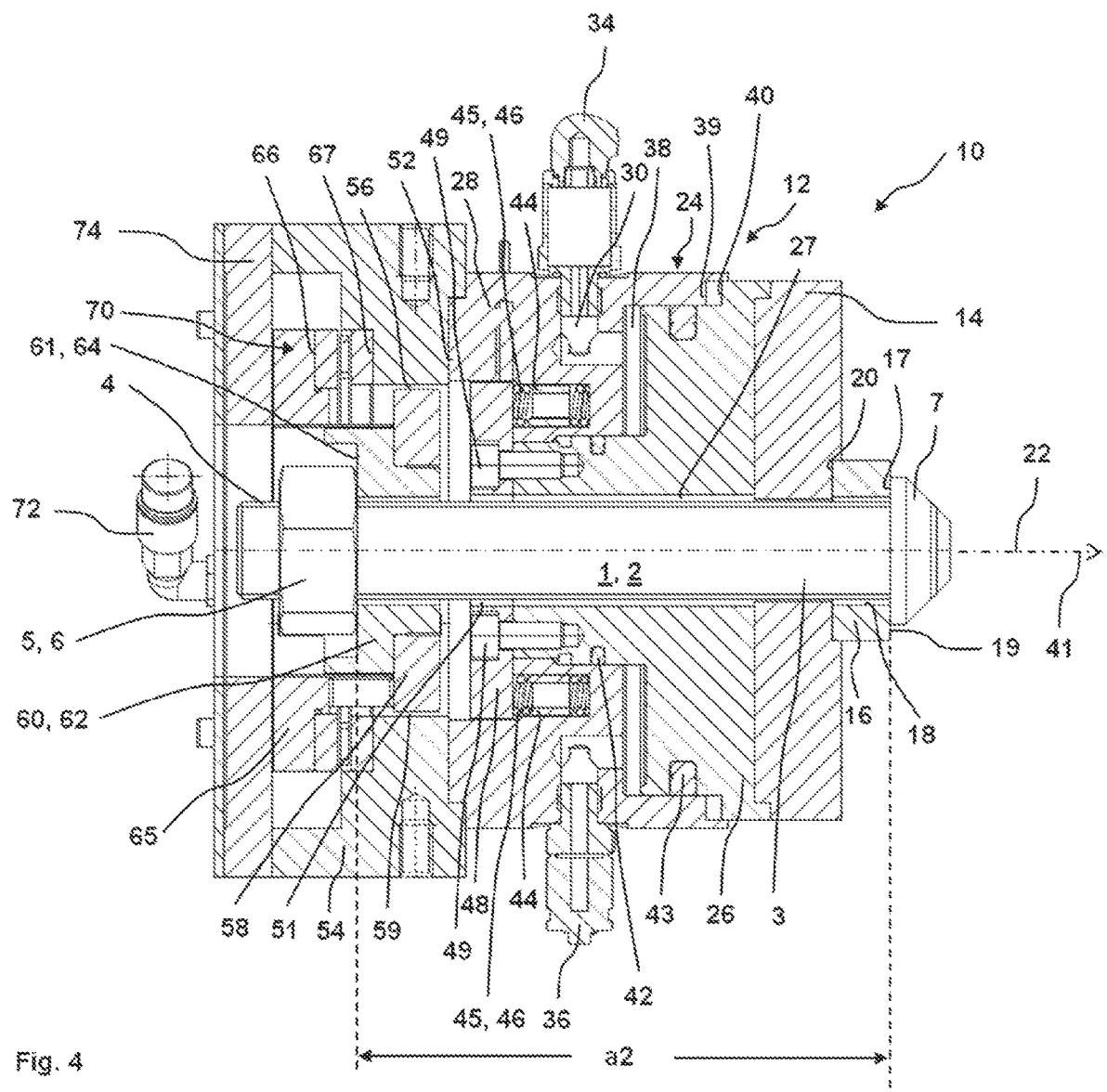

FIG. 3 shows the breakaway screw 2 mounted in the screw load testing device 10 by screwing the threaded portion 4 into the threaded nut 6. At the same time, it can be seen that the cylindrical portion 7 is in axial contact with the size change member 16 with its end face 17 on the side facing the housing 12. As shown in FIG. 3, a tightening torque is now applied to the breakaway screw 2 via the tool engagement surfaces of the head portion 9 of the breakaway screw 2 until it is destroyed in the area of the shear-off portion 8. This situation of the head portion 9 having been severed from the cylindrical portion 7 is shown in FIG. 4. Increasing the tightening torque of the screw 1 also increases the hydraulic pressure of the hydraulic medium in the pressure chamber 38 of the clamping device 24.

An axial force F acting on the breakaway screw 2 after application of the tightening torque and/or a torque M acting on the breakaway screw 2 after application of the tightening torque is thereby detected by means of the measuring device 70. In this respect, those skilled in the art may measure only the axial force F or only the torque M or may measure both the axial force F and the torque M.

Figure 5:
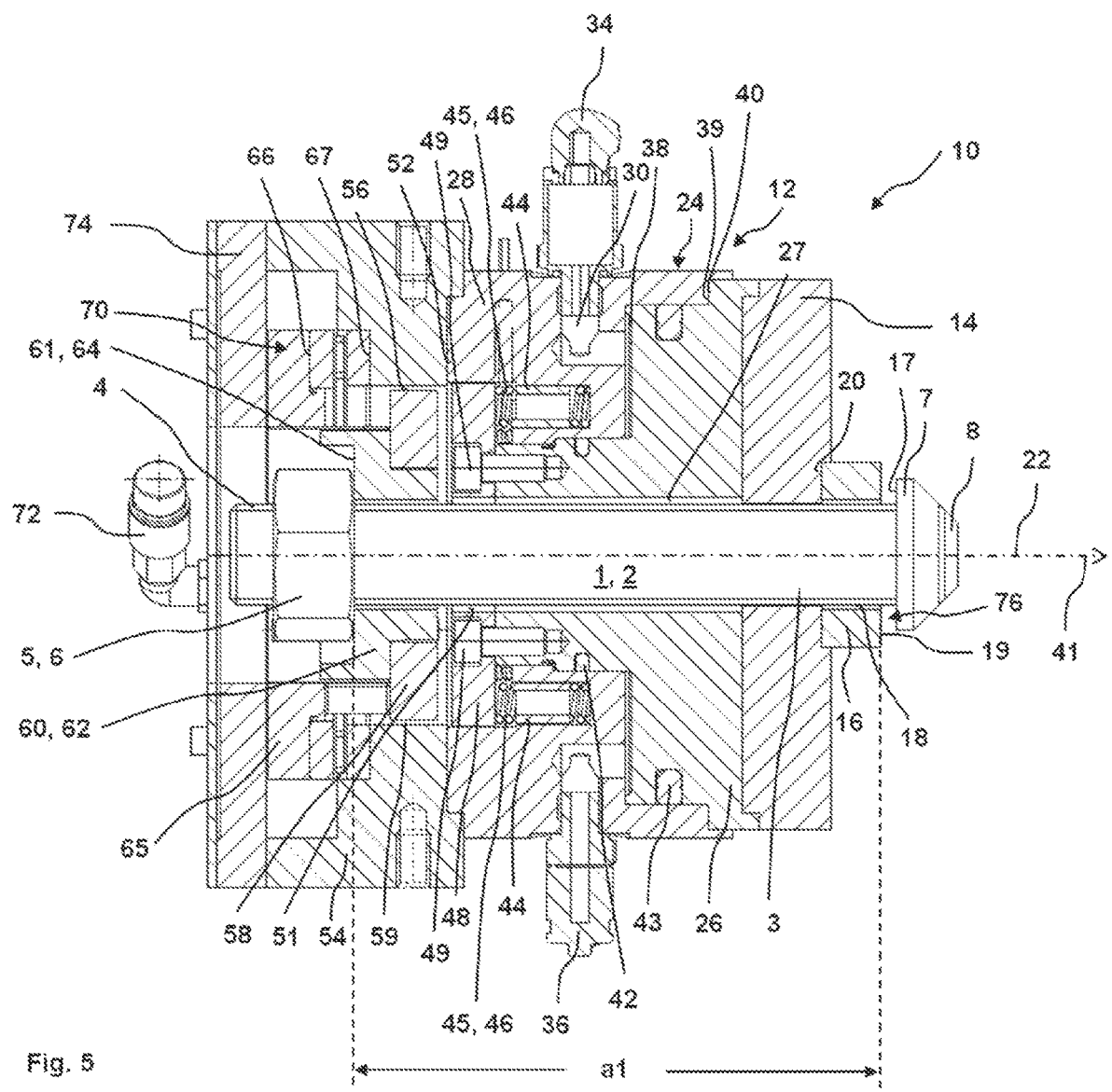

After the end of the test it is necessary to remove the fragments of the breakaway screw 2 that are now present under the axial load in the screw load testing device 10. For this purpose, first the hydraulic medium is allowed to flow back from the pressure chamber 38, in particular by opening the valve (not shown). Subsequently, the resetting means 46, i.e., the spring forces of the spring elements 45, cause the two members 26, 28 of the clamping device 24 to move from the second axial position back into their original first position. The resulting axial distance a1 between the two contact surfaces 19 and 61 is less than the second axial distance a2. In addition, as shown in FIG. 5 an axial gap 76 of, for example, 5 mm, is formed between the size change member 16 and the cylindrical portion 7 in the vicinity of the end face 17 of the breakaway screw 2. Thereby, it is particularly easy to unscrew the breakaway screw 2 via the cylindrical portion 7 or the shear-off portion 8 by hand from the mating element 5 or the threaded nut 6 and to remove the breakaway screw 2 from the housing 12 in the axial direction.

The screw load testing device 10 described above may be altered or modified in a variety of ways without departing from the spirit of the invention. In particular, it is noted that the screw load testing device 10, although it is described only in connection with a load test of breakaway screws 2, may of course also be used for load tests performed on conventional screws 1.

LIST OF REFERENCE NUMERALS 1 screw
2 breakaway screw
3 cylindrical portion
4 threaded portion
5 mating element
6 threaded nut
7 cylindrical portion
8 shear-off portion
9 head portion
10 screw load testing device
12 housing
14 first housing member
16 size change member
17 end face
18 through-hole
19 first contact surface
20 longitudinal groove
22 longitudinal axis
24 clamping device 26 first member of clamping device
27 through-bore
28 second member of clamping device
30 hydraulic connection portion
34 hydraulic element
36 vent connection element
38 pressure chamber
39 abutment surface
40 abutment surface
41 arrow
42 sealing element
43 sealing element
44 blind hole
45 spring element
46 resetting means
48 support plate
49 screw
51 through-bore
52 recess
54 further housing member
56 bore portion
58 annular washer
59 radial gap
60 sleeve-shaped insert
61 second contact surface
62 second housing member
63 dowel pin
64 end face
65 further washer
66 surface
67 surface
70 measuring device
72 plug connection
74 torque measuring body
76 axial gap
$a_1$ first distance
$a_2$ second distance

The invention claimed is:

1. A screw load testing device for a screw and a mating threaded nut, wherein the screw having an externally threaded portion at distal end of the screw and a proximal portion that is in monolithic connection to the screw and spaced apart from the externally threaded portion along a longitudinal axis, wherein the mating threaded nut defines an internally threaded through hole that is configured to make a threaded screw attachment with the externally threaded portion of the screw, the screw load testing device comprising:
a housing configured to arrange in an opposing disposition along the longitudinal axis, the screw and the mating threaded nut, said housing comprising a first housing member configured to interact at least indirectly via a size change member with the proximal portion of the screw that is in monolithic connection to the screw, wherein the size change member defines a first contact surface configured to contact the proximal portion of the screw, wherein the housing further comprising a second housing member configured to interact with the mating threaded nut and defining a second contact surface configured to contact the nut in a way that prevents axial movement of the nut toward the proximal portion of the screw, wherein the two housing members are arranged movably with respect to one another in the direction of the longitudinal axis;
a measuring device carried by the housing and configured for generating a measurement of an axial force acting on the screw along the longitudinal axis and/or a torque acting parallel to the longitudinal axis on the screw;
a clamping device carried by the housing between the first housing member and the second housing member, and configured for rendering the two housing members movable between a first position at least into a second position along the longitudinal axis, wherein the clamping device includes a first member and a second member disposed in opposition along the longitudinal axis from the first member; and
wherein when the housing is in the first position, a first distance in the direction of the longitudinal axis between first and second contact surfaces of the clamping device interacting with the screw and the mating threaded nut, respectively, is larger than a second distance along the direction of the longitudinal axis between the first and second contact surfaces in the second position;
wherein the second housing member is configured to restrain the nut against rotation during an application of the axial force on the screw along the longitudinal axis and/or the torque parallel to the longitudinal axis of the screw when the housing is arranged in the first position while the first and second contact surfaces are separated by the first distance in the direction of the longitudinal axis;
wherein the clamping device defines a pressure chamber disposed between the first housing member and the second housing member, wherein the pressure chamber is defined between the first and second members of the clamping device and wherein the clamping device is configured for controllably and selectively filling the pressure chamber with hydraulic fluid in advance of the screw being threaded into the nut and to dispose the first contact surface separated by the first distance from the second contact surface;
wherein the clamping device is configured to controllably and selectively drain hydraulic fluid from the pressure chamber to permit the first housing member to move sufficiently toward the second housing member along the longitudinal axis to dispose the second contact surface at the second position along the longitudinal axis wherein the first housing member becomes disposed sufficiently separated from the proximal portion of the screw to permit unscrewing the screw and the mating threaded nut when the housing is in the second position while the first and second contact surfaces are separated by the second distance in the direction of the longitudinal axis;
wherein the first member of the clamping device defines a plurality of blind holes, wherein adjacent ones of the plurality of blind holes are arranged at uniform angular intervals from each other, wherein each of the plurality of blind holes is aligned parallel to the longitudinal axis, wherein each of the plurality of blind holes contains a compression spring that is disposed to apply a resetting force tending to move the first and second members of the clamping device toward each other in the direction of the longitudinal axis.

2. The screw testing device according to claim 1, wherein the resetting force resulting from the combined effect of the plurality of compression springs is configured to move the first and second housing members in the direction of the second position when the clamping device is configured to controllably and selectively drain hydraulic fluid from the pressure chamber.

3. The screw testing device according to claim 1, wherein the clamping device includes a hydraulic connection portion connected to the pressure chamber and contains a hydraulic element that is connectable to a source of hydraulic fluid and includes a valve device.

4. The screw testing device according to claim 3, wherein the pressure chamber contains a hydraulic medium that is subject to hydraulic pressure that can be increased by increasing a tightening torque of the screw.

5. The screw testing device according to claim 1, wherein the size change member is disposed in rotationally fixed contact with the first housing member and includes a plurality of through-holes, wherein each of the plurality of through holes defining a diameter with respect to an axis that is parallel to the longitudinal axis, wherein the size change member configured to function as a mating element for the proximal portion in monolithic connection to the screw.

6. The screw testing device according to claim 1, further comprising:
- a further member;
- wherein the measuring device is arranged between the second housing member and the further member;
- wherein the second housing member and the further member are arranged so as to be movable relative to one another in the direction of the longitudinal axis and about the longitudinal axis; and
- wherein the measuring device is arranged in direct contact with the second housing member and the further member.

7. The screw testing device according to claim 1, wherein each of the first and second housing members is shaped as either a sleeve or a ring.

8. A method for load testing a screw and a mating element that cooperates with the screw, by using a screw load testing device, said method comprising at least the following steps:

- moving a first housing member and a second housing member of the screw load testing device by activating a clamping device disposed between the first and second housing members of the screw load testing device from a first position to a second position by filling a pressure chamber defined by the clamping device with hydraulic fluid while increasing an axial distance between a first contact surface defined by the first housing member and a second contact surface defined by the second housing member for contacting the screw;
- mounting the screw and the mating element that cooperates with the screw into the first and second housing members of the screw load testing device and through the clamping device;
- applying a tightening torque to the screw;
- deactivating the clamping device after the end of the load test by draining hydraulic fluid from the pressure chamber;
- using a plurality of compression springs arranged inside a respective plurality of blind holes defined in the clamping device and arranged at uniform angular intervals from each other to apply a resetting force tending to move the first and second housing members toward each other in the direction of the longitudinal axis; and
- removing the screw from the clamping device.

9. The method according to claim 8, wherein the step of removing the screw includes creating an axial gap between the first contact surface and a portion of the screw cooperating with the first contact surface.

10. The method according to claim 8, wherein the step of applying a tightening torque to the screw increases hydraulic pressure of a hydraulic medium in the pressure chamber of the clamping device.

* * * * *